United States Patent [19]
Vinton et al.

[11] 3,927,186
[45] Dec. 16, 1975

[54] METHOD FOR THE PREPARATION OF CARBON STRUCTURES

[75] Inventors: Clarence S. Vinton; Charles H. Franklin, both of Ann Arbor, Mich.

[73] Assignee: Chemotronics International, Inc., Ann Arbor, Mich.

[22] Filed: Feb. 28, 1973

[21] Appl. No.: 336,636

[52] U.S. Cl............. 423/447; 117/46 CA; 264/29; 423/445; 423/449
[51] Int. Cl............................................. C01b 31/07
[58] Field of Search ........... 423/445, 447, 448, 449; 264/29; 117/46 CC, 46 CB

[56] References Cited
UNITED STATES PATENTS

| | | | |
|---|---|---|---|
| 3,089,195 | 5/1963 | Woodburn | 264/29 |
| 3,198,714 | 8/1965 | Johnson et al. | 264/29 |
| 3,302,999 | 2/1967 | Mitchell | 423/445 |
| 3,345,440 | 10/1967 | Googin et al. | 264/29 |
| 3,387,940 | 6/1968 | McHenry et al. | 423/445 |
| 3,446,593 | 5/1969 | Moutaud | 423/449 |
| 3,574,548 | 4/1971 | Sands et al. | 423/449 |
| 3,632,385 | 1/1972 | Schmitt et al. | 117/46 CC |
| 3,635,676 | 1/1972 | Sands | 423/449 |
| 3,778,336 | 12/1973 | Adams | 264/29 X |

*Primary Examiner*—Edward J. Meros
*Assistant Examiner*—Eugene T. Wheelock
*Attorney, Agent, or Firm*—Miller, Morriss, Pappas & McLeod

[57] ABSTRACT

A rapid method for forming carbon structures from flexible polyurethane resin strands, which faithfully reproduces the geometry of the uncarbonized polyurethane resin strands, the first step of which comprises infusing the polyurethane resin strands with a curable furan resin or resin precursor. The furan resin as a curable liquid resin or resin precursor swells the polyurethane strands during infusion and forms a gel-like alloy structure with the polyurethane resin as the solid phase. An important step in the method which assists in preventing cracking during carbonization and which is essential to faithful strand geometry reproduction is the substantial removal of the liquid resin or resin precursor coating from the polyurethane strand surfaces after the infusion or swelling step. The method allows rapid carbonization with less than about five hours heating of the infused structures without cracking. The resulting carbon strands remain crack-free and strong even when exposed to rapid temperature variations. The carbonized strands are preferably in the form of vitreous or glassy carbon and are particularly useful for high temperature applications in the presence of neutral or reducing gas conditions or in a vacuum.

11 Claims, 5 Drawing Figures

METHOD FOR THE PREPARATION OF CARBON STRUCTURES

BACKGROUND OF THE INVENTION

The present invention relates to a method for forming novel carbon structures in the form of strands which faithfully reproduces the geometry of a non-carbonaceous polyurethane template structure. More particularly a method for forming strong, crack-free, interconnected carbon strands is described.

The prior art has described carbon structures from carbon particles mixed with liquid thermosetting furan resins which are shaped under pressure in a mold and then carbonized as the unsupported shape outside of the mold. Illustrative are the carbon structures shown in U.S. Pat. No. 3,089,195 which describes a slow temperature change of about 100°F (55°C) per hour up to 1000°F (538°C) to prevent cracking.

A method described for producing carbon structures (0.02 to 0.7 gm/cc) in the prior art involves the foaming of polyurethane resins in admixture with liquid furan resin precursors and subsequent unsupported carbonization of the combination. Carbon or other elements or compounds may also be incorporated. Illustrative are U.S. Pat. Nos. 3,345,440; 3,574,548 and 3,635,676 wherein the carbonization is achieved in a minimum of 36 hours. As stated in U.S. Pat. No. 3,574,548, slow heating was used to avoid spontaneous cracking.

Another prior art method for producing carbon structures is described in U.S. Pat. No. 3,446,593 wherein it is stated that a liquid furan resin is impregnated into a polyurethane foam having a density of 0.25 grams per cubic centimeter, and then the excess liquid resin may be driven out by drying. The resulting structure is left to rest, so that the furan resin is polymerized and hardened, for 4 to 8 days. The cured foamfuran resin structure is described as having a weight which is ten times that of the foam alone. The product is then carbonized in the unsupported form at an average heating speed of 5°C to 10°C per hour up to 1200°C. Thus the combined procedure takes about 9 or more days including about 5 days of closely regulated heating. The reason for the long, closely regulated heating time is to attempt to prevent the structures from spontaneously cracking apart during carbonization. The structures are described as having a density of the order of 0.1 and 0.4 gm/cc. The structure described does not faithfully reproduce the geometry of the polyurethane foam because of the excess amount of cured furan resin in the foam pores.

It is therefore an object of the present invention to produce crack-free carbon structures by a method which requires only a few hours to produce them. Further, it is an object of the present invention to provide a method which is simple and economic, particularly because of the elimination of the need for precise temperature change regulation and because of the rapid carbonization times. Further, it is an object of the present invention to produce strong, crack-free, carbon filaments or strands which faithfully reproduce the form of a filamentary polyurethane parent material, such as the interconnected strand network formed by the reticulation of a precursor polyurethane foam. These and other objects will become increasingly apparent by reference to the following description and the drawing.

DESCRIPTION OF THE INVENTION

The present invention relates to a method for forming a carbon structure which comprises: infusing at least one thin cross-section strand of a flexible polyurethane resin with a liquid polymerizable furan resin or resin precursor so as to cause the strand to swell by infusion of the liquid furan resin or resin precursor into the strand, removing substantially all of the non-infused resin or resin precursor from the surfaces of the strand, polymerizing the precursor or resin in the strand with a catalyst, and carbonizing the structure under vacuum, neutral or reducing conditions, thereby allowing carbonization to be achieved at a rate of temperature change which causes cracking of the strand when substantial thermosetting resin remains on the surfaces and also allowing faithful reproduction of the original strand geometry. Carbonization can also be achieved in the presence of a polymerization catalyst for the liquid furan resin or resin precursor without a specific polymerization step. Further, the present invention relates to a carbon structure which comprises at least one crack-free, thin cross-section strand of carbon which faithfully reproduces the shape of a polyurethane strand infused with a cured thermoset furan resin and with a cured weight of up to about 6 times that of the strand alone and which during and after carbonization resists cracking due to rapid temperature changes up to about 2500°C under vacuum, neutral or reducing conditions.

Unexpectedly, it has been found that by swelling a flexible polyurethane resin strand by infusing it with an uncured liquid furan resin or resin precursor and then removing substantially all of the resin or resin precursor from the surfaces of the strand prior to curing or thermosetting the resin or resin precursor, that cracking does not occur upon subsequent rapid carbonization. The carbonization can be very rapidly completed in less than about five hours. The infused structures before or after curing can be placed in a cold oven and heated up to the carbonization temperature with no regulation of the rate of temperature change as the oven heats.

It has been found as a result of the substantial removal of the resin or resin precursor from the strand surfaces after thorough infusion of the resin or resin precursor within the polyurethane strand that there is no need to allow several days for thermosetting of the liquid furan resin as indicated by U.S. Pat. No. 3,446,593 to be necessary. Using low temperature heating, the thermosetting of the furan resin or resin precursor can be accomplished in a few hours to form a hard, rigid product exhibiting the characteristics of a homogeneous alloyed material which is then ready for rapid carbonization. Alternatively, the infused but uncured structure can be fired directly to achieve carbonization.

The fexible polyurethane resins are well known to those skilled in the art and include polyether and polyester resins, particularly those derived from toluene diisocyanate. The flexibility of the polyurethane resins allows the easy removal of the liquid furan resin or resin precursor from the strand surfaces by centrifugation or other mechanical techniques.

Polyurethane resins are prepared by the reaction of a polyisocyanate with a polyol or a polyester along with various other materials. For foams, which can be used as the precursor material for the reticulate polyurethane strand structure, a gas or vapor is usually generated in situ while the reaction mixture remains in the plastic or fluid state. The generation of this gas results in the formation of bubbles, approximately spherical in form in the plastic material. As these bubbles expand, cells are formed and the resulting structure of the material is comprised of a skeletal structure and cell membranes.

Illustrative of a method of preparation of a flexible polyester polyurethane cellular material is Example I.

EXAMPLE I

Step A

Into a closed container, equipped with an agitator and means for maintaining a nitrogen gas sweep, were charged, at room temperature, 50 parts by weight of an approximately 80:20 isomeric mixture of toluene-2,4-diisocyanate and toluene-2,6-diisocyanate and 50 parts by weight of a polyester resin (alkyd)(Parapfex U-148 sold by Rohm and Haas Company, Philadelphia, Pa.) having the following properties:

| | |
|---|---|
| Average molecular weight | 1800–2000 |
| Equivalent weight | 745–830 |
| Hydroxyl number | 64–75 |
| Acid number | 3 maximum |
| Water content | 0.25 percent maximum |
| Average hydroxyls per molecule | 2.42 |

The above-described mixture was agitated under a maintained nitrogen atmosphere for four hours, the temperature rising to approximately 32°C.

Step B

Eighty parts by weight of the polyester resin (alkyd) referred to in Step A above, 0.6 parts by weight of a polyoxyethylated vegetable oil dispersing agent (Emulphorel-719 sold by General Aniline and Film Corporation, New York City, N.Y., 4.5 parts by weight of water and 1.9 parts by weight of diethylethanol amine were blended at room temperature.

Step C

One hundred parts by weight of the reaction mixture of Step A were added to 87 parts by weight of the reaction mixture of Step B and thoroughly mixed for about 20 seconds at a starting temperature of about 25°C. The mixture was then immediately poured into a container of sufficient volume to permit expansion. After about 15 minutes the product set into a cellular mass, the temperature rising to about 75°C. The container together with the foamed cellular mass was placed in an oven and held at about 70°C for approximately 16 hours. The product, a flexible polyester polyurethane resin, was in the form of a cellular of foamed material.

Another conventionally prepared polyurethane resin is the flexible polyalkylene ether polyurethane cellular material. Illustrative of a method of preparation is Example II.

EXAMPLE II

Step A

Into a closed, agitated vessel, equipped with an nitrogen gas sweep, were charged, at 40°C, 100 parts by weight of a molten polyalkylene ether having a hydroxyl number of 37.6, water content of 0.04% and melting point of about 35°C., identified as "Teracol 30" which is believed to be a 1,4-polybutylene ether glycol (E. I. DuPont and Company, Inc., Wilmington, Del.), and 12.6 parts by weight of the toluene-2,4- and 2,6-diisocyanate (80:20 mixture employed in Example I). There was a mildly exothermic reaction, the temperature rising to about 45°–50°C. Heat was then applied and the mixture was maintained at 60°C for 2½ hours. An additional 12.6 parts of the isomeric diisocyanate mixture was then added and the temperature was raised and maintained at 140°C for an additional 2½ hours. The charge was then cooled to 50°C and a further 3.7 parts by weight of the isomeric mixture of the diisocyanate was added to the reaction mixture. Finally, the product was allowed to cool to room temperature of about 25°C.

Step B

A blend, at 30°C, was prepared of 51 parts by weight of dioctyl sebacate, a plasticizer-softener; 10 parts by weight of n-methylmorpholine and 2.5 parts by weight of triethylamine catalyst; 5.0 parts by weight of a conventional silicone foam stabilizer (Dow Corning DC-200, dimethyl polysiloxane fluid, 50 cstks); and 22.5 parts by weight of water.

Step C

To the reaction mixture of Step B were added 1000 parts by weight of the reaction mixture of Step A, and the mixture was stirred rapidly for about 20 seconds. Immediately thereafter the mass was poured into a container of sufficient volume to permit expansion; and after about 30 minutes the container together with the foamed mass was placed in an oven and maintained at 70°C for about 16 hours. The product was a polyalkylene ether polyurethane resin, in the form of a cellular structure.

Examples I and II illustrate conventional processes for the preparation of polyester and polyether polyurethane cellular materials. These and other polyurethane materials (e.g., the so called "one-shot" polyether polyurethanes) can be used as precursors for the reticulate polyurethane strand structures which can be used as the precursors for the carbon structures of the present invention. Further, it will be appreciated that Examples I and II are only illustrative of conventional processes for preparation of cellular polyurethane materials. The production of flexible polyurethane materials, particularly cellular materials of various types, is well understood in the polymer art and is described for example in "German Plastics and Practice" published by DeBell and Richardson, 1946, Chapter 21, "Plastic Foams", pages 462–465; "Papers Presented at the Atlantic City Meeting: Synthesis of Isocyanate Polymers" published by the American Chemical Society, Division of Paints, Plastics and Printing Ink Chemistry, September, 1956; and in the patent literature and more recent publications.

Solid elastomeric polyurethanes, suitable as precursors for the filamentary carbon structures of the present invention, can be made into filamentary form by a variety of methods such as extruding, spinning or casting and their preparation is described in Polyurethanes: Chemistry Technology, Part II by Saunders and Frisch, Interscience Publishers, 1964, starting on p. 694.

The furan resins useful for the method of the present invention for producing the carbon structures are provided in situ in liquid monomeric, prepolymer or prethermoset form in the flexible polyurethane resin strand. The polyurethane resin strands swell in contact with the liquid resin or resin precursors of furan resins to form a gel-like structure. After removal of unabsorbed liquids, they can then be polymerized or cured to a solid within the polyurethane structure. The furan resin precursors which are preferred are furfuryl alcohol alone or liquid relatively low molecular weight furfuryl alcohol polymers (prepolymers) alone or mixed with furfuryl alcohol. The prepolymers can be used alone or in admixture with other compatible solvents or resins. The liquid furan resin precursors are catalyzed by mineral or organic acids to form thermosetting resins. Partial polymerization can be used to vary the viscosity of the liquid resin before infusion. Furan resin systems are described generally in *Polymers and Resins*, Brage Golding, pages 366 to 373 (D. Van Nostrand Company, Inc. 1959).

Figure 1:
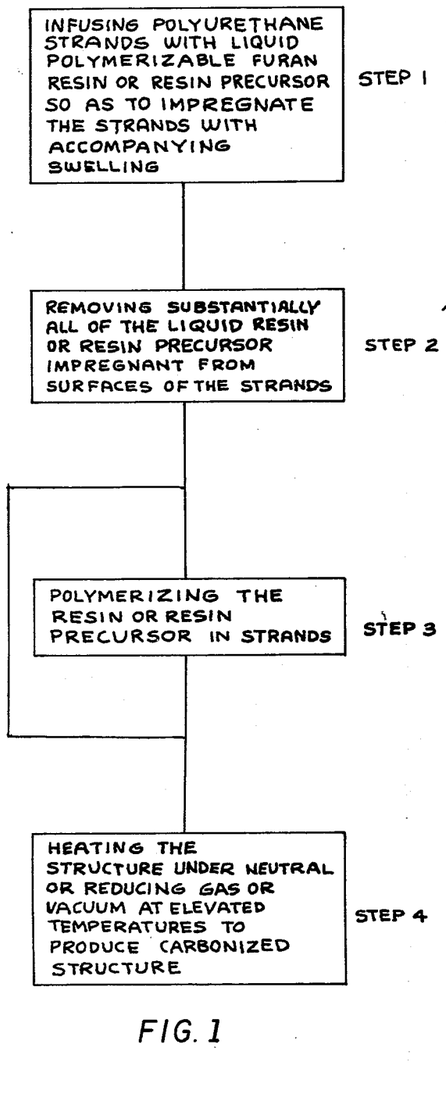
FIG. 1 schematically illustrates in Steps 1 to 4 the preferred method of the present invention.
Figure 2:
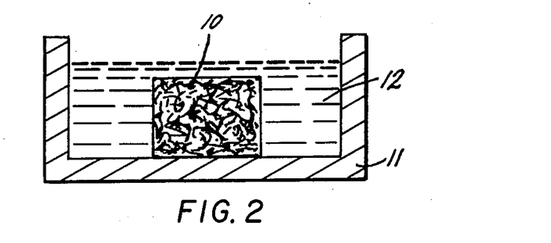
FIG. 2 particularly illustrates the mechanical means for the removal of substantially all of the liquid furan resin or resin precursor from the surfaces of a reticulated polyurethane structure which was derived from a polyurethane foam by a reticulation process. As can be seen, Step 3 as shown in FIG. 4 can be by-passed and the wet infused structure can be fired directly as shown in FIG. 5 in the presence of a polymerization catalyst.

The preferred method of the present invention is illustrated in FIGS. 1 to 5. In Step 1 as shown in FIG. 2 the flexible polyurethane strands 10, preferably in the form of a reticulated polyurethane structure, are provided in a container 11 and immersed in a catalyzed or uncatalyzed liquid furan resin precursor 12. The swelling of the polyurethane strands is thus accomplished.

Figure 3:
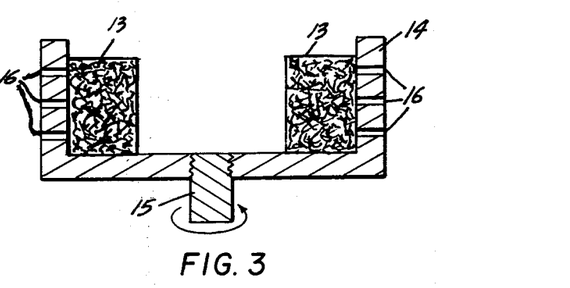

In Step 2 as shown in FIG. 3, the swollen strands 13 are treated so as to remove substantially all of the furan resin precursor 12 from their surfaces, preferably by centrifugation by a drum 14 rotated on axis 15 and with peripheral holes 16 for liquid furan resin or resin precursor removal. Gentle pressing (not shown) of the swollen flexible polyurethane 10 on an absorbent material can also be used particularly with small size samples. In any event, substantially all of the precursor 12 is removed from the surfaces of the strands 13.

Figure 4:
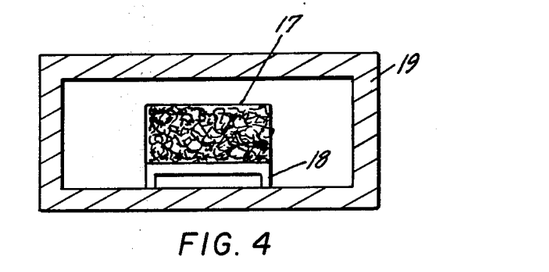

In Step 3 as shown in FIG. 4, the treated strands 17 are cured on a rack 18 which is provided in an oven 19 by heating to thermoset the acid catalyzed resin in the strands 13. As shown in FIG. 1, this step can be bypassed and the wet infused structure can be fired directly in the presence of a polymerization catalyst. The catalyst may be provided in the furan resin precursor before infusion, such as by dissolving citric acid in the liquid furan resin precursor, or after infusion into the polyurethane strands, such as by contacting the strands with an acid such as dilute phosphoric acid or acetic acid vapors. The thermosetting of the furan resin is accomplished at temperatures preferably between about 120°C and 200°C. The cured furan resin and polyurethane strand structure will have a weight up to about 6 times that of the strands alone.

Figure 5:
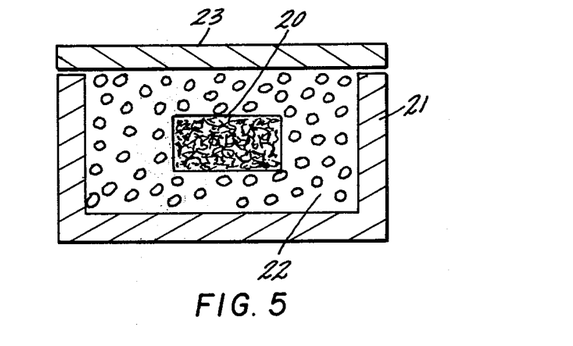

In Step 4 as shown in FIG. 5, the product 20 is produced by carbonizing the thermoset furan resin and polyurethane resin combination 17 in a neutral or reducing atmosphere or in a vacuum at elevated temperatures. In one method the combination 17 is surrounded with pieces of charcoal 22, in a container 21 with a loose fitting cover 23 and carbonized. Charcoal is economical and functions to eliminate oxygen and to maintain reducing conditions. However, other gaseous neutral or inert atmospheres such as nitrogen or argon or gaseous reducing agents or reducing gaseous atmospheres such as methane or a vacuum can be provided in the container 21 with sealing by the cover 23 to prevent the oxidation of the carbon structures 20 by excluding reaction with oxidizing gases during carbonization and during cooling.

Various shapes of carbon structures of strands can be produced by the method of the present invention such as single strands; woven meshes of strands; reticulated structures; non-woven nets or mats of fibers or strands; crimped strands and the like. The flexible polyurethane strands used as starting materials in the method of the present invention can be single or multiple layered, and crimped or non-crimped. Diameters in the range of 0.005 cm to 0.1 cm are suitable.

The polyurethane foams which are used as a precursor to the starting materials in the present invention must be reticulated to form the starting material, that is the membranes dividing contiguous cells produced as a result of foaming such as by Examples I and II, have been removed. Foam structures are reticulated by mechanical means, including air or water blasts; chemical means, particularly hydrolysis of the polyurethane resin, or preferably by thermal means as shown in U.S. Pat. No. 3,175,025 by the combustion of gas mixtures inside the foam to destroy the membranes leaving the filamentary strand structure, thus altering the geometry from a foam to a reticulate structure. The reticulated polyurethane structures provide a workable geometry of thin cross-section strands for easy removal of liquid furan resin or resin precursor from the strand surfaces prior to curing and can be rapidly heated to produce thermosetting of the furan resin or resin precursor and subsequent carbonization. The open structure of reticular polyurethane also permits ready infusion of the strands by the liquid furan resin or resin precursor. Foam structures are not suitable because the windows or membranes retain substantial quantities of the furan resin or resin precursor.

The arrangement of carbon atoms in the products produced by the method of the present invention varies depending upon the temperature, duration and/or conditions of carbonization. The preferred form is termed "glassy" or "vitreous" carbon, which is generally characterized as disordered carbon whose crystal structures are distinctive in this respect, as is well defined in the literature. This can be obtained by firing at about 1000°C or higher. Firing can go to about 2500°C or even higher, but it is unnecessary for many applications. The carbonized products produced, regardless of the extent of carbonization, are crack-free and remain resistant to cracking due to 0.03 temperature changes under non-oxidizing conditions. Conditions of carbonization to produce vitreous carbon are well known in the art and the present invention uses the same ultimate temperatures of carbonization as prior art methods, but differs in that the time required to reach these carbonization temperatures is very greatly reduced by the present method. The reticulated carbon structures produced have a density of between and 0.08 gm/cc.

Having generally described the method and products of the present invention, the following are specific Examples III to XII.

In Examples III to XII all measurements, and calculations derived therefrom, have been rounded to significant numbers.

EXAMPLE III

Furan Resin Precursor

Ninety-five parts of furfuryl alcohol were reacted with 5 parts citric acid crystals by weight at 120°C until the viscosity started to increase. Then the precursor was water cooled to 35°C where upon the viscosity further increased. The viscosity was measured to be about 300 centipoises at about 35°C.

Carbon

Using the previously prepared precursor, a 5 cm cube of reticulated polyurethane structure having a mean strand spacing of about 0.25 cm prepared from a polyurethane foam with a starting weight of 4.1 gms and starting density of 0.033 gm/cc was infused for 15 minutes at 35°C. All non-infused precursor was carefully pressed off the surfaces of the strands of the samples on to an absorbent material. The infused cube, now 6 cm × 5.8 × 5.5 cm in size and having a weight of 18.6 gms, was cured in an oven for 20 hours at 122°C. After the cure, the sample weight was 13.8 gms. The sample was placed in a retort (9 cm cube) packed with charcoal to prevent oxidation. A loose fitting lid was placed on the retort. The retort was placed in a cold furnace. The furnace temperature was raised to 1100°C in 3½ hours. Then an additional heating period of 1 hour at 1100°C was allowed before the retort was removed from the furnace and air cooled to room temperature. The final weight was 6.0 gms and final dimensions were 4.6 cm cube. The final density was 0.062 gm/cc.

EXAMPLE IV

Using the resin, reticular structure and processes of Example III, a sample having a mean strand spacing of about 0.25 cm was processed as follows:

| | |
|---|---|
| Size | 5 cm cube |
| Start weight | 4.2 gm |
| Density before infusion | 0.034 gm/cc |
| Infused | 2 hours at 26°C |
| Wet weight | 24.9 gm |
| Wet size | 6.4 cm cube |

$$\% \text{ Weight Increase} = \frac{\text{Wet Weight} - \text{Start Weight}}{\text{Start}} = \frac{24.9 - 4.2}{4.2} \times 100 = 490\%$$

| | |
|---|---|
| Infused Density | 0.095 gm/cc |
| Weight after cure | 18.0 gms |
| Weight after 1100°C furnace treatment | 7.3 gms |
| Final size | 5 cm × 5 cm × 4.6 cm |
| Final Density | 0.063 gm/cc |

EXAMPLE V

Using the resins and processes of Example III, a reticulated sample having a mean strand spacing of about 0.13 cm was processed as follows:

| | |
|---|---|
| Size | 5 cm cube |
| Starting weight | 3.7 gms |
| Density before infusion | 0.030 gm/cc |
| Infused for 1 hour at 26°C | |
| Wet Weight | 22.6 gms |
| Wet Size | 5.8 cm × 6.0 cm × 6.0 cm |
| Infused Density | 0.108 gm/cc |
| % Weight Increase | 510% |
| Weight after cure | 17.1 gms |
| Weight after furnace | 7.4 gms |
| Final dimension | 4.6 cm cube |
| Final Density | 0.076 gm/cc |

EXAMPLE VI

Using the resin and processes of Example III, a reticulated sample having a mean strand spacing of about 0.06 cm was processed as follows:

| | |
|---|---|
| Starting Size | 5 cm cube |
| Starting Weight | 4.2 gms |
| Infused for 1 hour at 26°C | Note: viscosity of alcohol has increased making squeeze removal of the resin difficult |
| Infused weight | 33.1 gms |
| Infused dimension | 6.4 cm × 6.6 cm × 6.9 cm |
| Infused density | 0.114 gm/cc |
| % Weight increase | 690% |
| Weight after cure | 24.9 gms |
| Weight after furnace | 10.1 gms |
| Final dimensions | 5.3 cm × 5 cm × 4.8 cm |
| Final Density | 0.079 gm/cc |

EXAMPLE VII

Furan Resin Precursor

Furfuryl alcohol was reacted with 5% by weight citric acid crystals at 70°C until the transparent monomer turned slightly yellow and then cooled to room temperature. This resin was added 50% by volume to the previously prepared precursor of Example III.

Using the new furan precursor, the process of Example III was repeated using a reticulated sample having a mean strand spacing of about 0.13 cm as follows:

| | |
|---|---|
| Starting Size | 5 cm cube |
| Starting Weight | 3.6 gms |
| Infused for 2.5 hours at 30°C | |
| Infused dimension | 7 cm × 7 cm × 6.9 cm |
| Weight after cure | 10.3 gms |
| Weight after furnace | 4.4 gms |
| Final dimension | 4.8 cm × 4.6 cm × 4.3 cm |
| Final Density | 0.046 gm/cc |

EXAMPLE VIII

Using the precursor of Example VII, Example III was repeated using a reticulated sample having a mean strand spacing of about 0.06 cm as follows:

| | |
|---|---|
| Starting size | 5 cm cube |
| Starting weight | 4.3 gms |
| Infused for 1 hour at 30°C | |
| Infused weight | 16.2 gms |
| Infused size | 6.6 cm × 6.6 cm × 6.9 cm |
| Infused density | 0.054 gms/cc |
| % Weight increase | 280% |
| Weight after cure | 10.3 gms |
| Weight after furnace | 4.4 gms |
| Final dimension | 4.8 cm × 4.6 cm × 4.3 cm |
| Final Density | 0.046 gms/cc |

EXAMPLE IX

Furan Resin Precursor

Furfuryl alcohol reacted with 5% citric acid crystals as in Example III but for a shorter period of time to reduce the resin viscosity.

Carbon

A fiber of 20 denier mono filament polyurethane (DuPont, Lycra) was infused for 2 minutes at room temperature. A noticeable increase in filament length occurred during immersion. The prepolymer was removed from the fiber surface by absorption on paper towels. The infused filament was placed in an oven at 100°C for 8 hours and then the temperature was raised to 120°C for 2 hours, then raised to 200°C for 2 hours. The filament was placed in a reticulated sample (as a holder) which had been infused with prepolymer at the same time as the filament and processed the same as the filament. A hole was cut into the reticular sample and two slits were provided in the sides of the hole so that the filament was supported across the hole. The top half of the reticular sample was covered with another infused reticular piece for protection and placed into a retort with charcoal as in Example III. The furnace treatment was the same as described in Example IV. The resulting glassy carbon filament was about 0.0036 cm in diameter.

EXAMPLE X

Fast Pyrolysis of Reticulated Samples Using Low and High Viscosity Furfuryl Alcohol with 5% Citric Acid Catalyst The low viscosity furfuryl alcohol prepolymer was prepared by reactng furfuryl alcohol with 5% by weight citric acid at about 100°C until the alcohol just turned dark brown. It was then quickly cooled to room temperature. When at room temperature the prepolymer was used to infuse the samples. As usual all prepolymer was carefully taken off the strand surfaces of the samples. Curing was accomplished in two stages inasmuch as not all samples appeared to be completely thermoset at the end of the 100°C cure. The carbonization step in all cases was accomplished by inserting the cured sample in a furnace which was at room temperature at the start of the carbonization cycle; it took 3½ hours to reach 1000°C under these conditions.

| A. Low Viscosity | | | | |
|---|---|---|---|---|
| Approximate mean strand spacing (cm): | 0.25 | 0.13 | 0.06 | 0.03 |
| Original weight (grams) | 3.3 | 3.0 | 3.3 | 3.0 |
| Wet weight (grams) | 14.2 | 10.9 | 11.6 | 10.8 |
| Weight after 100°C cure for 18 hours (grams) | 4.7 | 3.9 | 4.3 | 4.1 |
| Weight after 205°C cure for 6 hours (grams) | 4.3 | 3.6 | 4.0 | 3.8 |
| Weight after furnace-room temperature to 1000°C in 3.5 hours (grams) | 1.4 | 1.1 | 1.1 | 1.1 |
| Size (diameter by height, cm) | 3.7 by 3.1 | 3.4 by 3.1 | 3.4 by 3.1 | 3.4 by 3.1 |
| Final Density (gm/cc) | 0.042 | 0.039 | 0.039 | * 0.039 |

* This sample was used for air flow data (Table II)
Note: The reticulated starting material in both low and high viscosity preparations was cut in cylinders 5 cm diameter × 5 cm long = 98 cubic cm prior to infusion and further processing.

The high viscosity furfuryl alcohol prepolymer used was prepared by reacting furfuryl alcohol with 5% by weight citric acid at about 120°C until the viscosity was approximately 150 centipoises, then quickly cooled to room temperature. The followiing samples were infused with this prepolymer and then it was removed from the surfaces of the strands. Working the prepolymer out of the 0.03 cm strand spacing sample was difficult because of the high resin viscosity.

| B. High Viscosity | | | | |
|---|---|---|---|---|
| Approximate mean strand spacing (cm): | 0.25 | 0.13 | 0.06 | 0.03 |
| Original weight (grams) | 3.3 | 2.9 | 3.3 | 3.0 |
| Wet weight (gms) | 12.1 | 10.4 | 16.5 | 17.7 |
| Weight after 100°C cure for 18 hours (gms) | 7.9 | 7.0 | 11.1 | 12.5 |
| Weight after cure at 205°C for 6 hours (gms) | 7.5 | 6.7 | 10.0 | 11.8 |
| Weight after furnace-room temperature to 1000°C in 3.5 hours (gms) | 3.3 | 3.0 | 5.0 | 5.4 |
| Size (cms) | 4.8 by 4.0 | 4.6 by 4.4 | 4.9 by 4.7 | 5.0 by 4.7 |
| Final Density (gm/cc) | *0.046 | 0.041 | *0.056 | *0.059 |

*These samples used for air flow data Table II

EXAMPLE XI

The following example illustrates very rapid carbonization by using a preheated furnace and very short treatment time.

Furan Resin Precursor

Ninety gms furfuryl alcohol was added to a premix of 5 gms tartaric acid and 5 gms of water. The mixture was not polymerized at elevated temperatures.

Carbon

A 2.5 cm diameter, 2.5 cm long, reticulated sample having a mean strand spacing of about 0.25 cm was infused with the catalyzed alcohol at room temperature for 15 minutes. The alcohol remaining on the surface was removed by centrifugation. The sample was then placed in a preheated 165°C oven for 30 minutes. The sample was then placed in a 9 × 9 cm × 9 cm high retort with charcoal in the bottom. A loose fitting cover was put on the retort before placing it in a furnace preheated to 1000°C. The furnace temperature dropped to 900°C when the sample was put in, but recovered in 12 minutes; an additional 18 minute time at 1000°C was allowed before the retort was removed from the furnace and allowed to cool to about 300°C before the glassy carbon sample was removed from the retort. The following is the data on the sample:

| | |
|---|---|
| Starting Weight | 0.4 gms |
| Infused Weight | 1.6 gms |
| Final Weight | 0.2 gms |
| Final dimension | 1.9 cm diameter × 1.9 cm long |
| Final Density | 0.037 gm/cc |

EXAMPLE XII

The following example illustrates the unexpected ability to produce the carbonaceous strand structure directly from the infused but uncured polyurethane by using a preheated furnace to very rapidly raise the structure to carbonization temperature without preceding the carbonization step with a curing or rigidification step for the furan polymer.

Ninety gms of furfuryl alcohol were mixed with a solution of 5 gms of oxalic acid with 5 gms of water. A sample of reticulated polyurethane having a mean strand spacing of about 0.03 cm was soaked in the above alcohol at room temperature for 10 minutes. The alcohol remaining on the strand surfaces was removed by centrifugation. The sample was then suspended in a 6.4 cm I. D. pipe 7.6 cm long by two wire rods through the upper part of the sample. The pipe was placed in a steel retort having 0.6 cm walls and inside dimensions of 9 × 9 × 9 cm high. Charcoal was put in the region between the retort and the pipe. A loose fitting cover was put on the retort, which was at room temperature, before it was placed into a 1000°C preheated electric furnace with a heated region measuring about 25 cm wide × 22 cm high × 34 cm deep. The initial furnace temperature was at 1000°C, but dropped to 900°C when the retort entered, then recovered in about 12 minutes to 1000°C, at which time the retort was removed from the furnace and allowed to cool to about 300°C before removing the sample. The following is the data on the sample:

| | |
|---|---|
| Starting weight | 0.92 gms |
| Starting dimensions | 2.5 cm diameter × 5.0 cm long |
| Infused weight | 4.0 gms |
| Infused dimension | 4.0 cm diameter × 7.6 cm long |
| Final weight | 0.5 gms |
| Final dimension | 1.9 cm diameter × 5.0 cm long |
| Final Density | 0.035 gms/cc |

Table II shows the air flow values for the reticulated carbon products of the present invention.

TABLE II

Air Flow Data For Products
(Through a 1 cm² by 1 cm thick sample)

| Furan | Mean Strand Spacing (cm) | Air Flow (Liters per hour) *P=5 mm Hg | *P=10 mm Hg | *P=20 mm Hg |
|---|---|---|---|---|
| High Viscosity | 0.25 | 4,900 | 6,000 | 9,600 |
| High Viscosity | 0.06 | 3,200 | 4,900 | 7,000 |
| High Viscosity | 0.03 | 1,800 | 2,250 | 4,500 |
| Low Viscosity | 0.03 | 1,100 | 1,900 | 3,200 |

*P equals the differential pressure across the sample thickness.

Examples XI and XII illustrate extremely rapid carbonization of the sample without consequent cracking.

All of the samples of vitreous carbon in Examples III to XII exhibited a high degree of electrical conductivity. Such conductivity is an electrical characteristic of vitreous or glassy carbon. Additionally, samples of the materials produced by the above Examples were examined by X-ray difraction and found to be typical of vitreous carbon.

We claim:

1. The method for forming a carbon structure which comprises:
   a. infusing at least one thin cross-section strand of a flexible polyurethane resin with a liquid polymerizable furan resin or resin precursor so as to cause the strand to swell by infusion of the liquid furan resin or resin precursor completely through the strand;
   b. removing substantially all of the non-infused resin or resin precursor from the surfaces of the strand;
   c. polymerizing the resin or resin precursor in the strand with a catalyst to form a thermoset resin wherein the infusing, removing and polymerizing of the resin or resin precursor produces a resulting weight up to about 6 times the weight of the strand alone;
   d. carbonizing the strand under neutral or reducing gas or vacuum conditions in an oven which rapidly heats the strand to a temperature sufficient to obtain carbonization, thereby aallowing crack free carbonization to be achieved in less than about 5 hours at a rate of temperature change which causes cracking of the strand when substantial thermoset resin remains on the surfaces.

2. The method of claim 1 wherein the non-infused liquid furan resin or resin precursor is removed by centrifugation prior to polymerization.

3. The method of forming a vitreous carbon structure which comprises
   a. infusing a reticulated flexible polyurethane structure formed of thin cross-section strands with a liquid thermosetting furan resin or resin precursor so as to cause th strands to swell by infusion of the liquid furan resin or resin precursor completely through the strands;

b. removing substantially all of the non-infused resin or resin precursor from the surfaces of the strands;

c. polymerizing the resin or resin precursor in the structure to form a polymerized, thermoset and hardened structure wherein the infusing, removing and polymerizing of the resin or resin precursor produces a resulting weight up to about six times the weight of the structure alone; and d. heating the polymerized hardened pretreated structure under neural or reducing gas or vacuum conditions in an oven which rapidly heats the structure to a temperature of at least about 1000°C so as to form the vitreous carbon structure, whereby crack free carbonization is achieved in less than about 5 hours at a rate of temperature change of the structure which causes cracking of pretreated strands with non-infused thermoset resin coated on the surfaces.

4. The method of claim 3 wherein the heating is continued for at least about 12 minutes until vitreous carbon is formed.

5. The method of claim 3 wherein the liquid furan resin precursor is furfuryl alcohol which is infused into the strands of the structure.

6. The method of claim 3 wherein the liquid furan resin is a furan resin prepolymer prepared by partially reactng furfuryl alcohol with citric acid which is thermoset in the strands of the structure by heating to 120°C to 200°C.

7. The method of claim 3 wherein the non-infused liquid furan resin or resin precursor is removed by centrifugation.

8. The method of claim 3 wherein the catalyst is acetic acid vapors which are provided in contact with the liquid furan resin or resin precursor infused reticulated structure.

9. The method of claim 3 wherein the catalyst is an aqueous solution of phosphoric acid into which the liquid furan resin or resin precursor infused reticulate structure is immersed.

10. The method for forming a carbon structure which comprises:

a. infusing at least one thin cross-section strand of a flexible polyurethane resin with a liquid polymerizable furan resin or resin precursor so as to cause the strand to swell by infusion of the liquid furan resin or resin precursor completely through the strand;

b. removing substantially all of the non-infused resin or resin precursor from the surfaces of the strand wherein the infusing and removing of the non-infused resin or resin precursor would produce upon curing cured resin and strand weight of up to about six times the weight of the strand alone;

c. carbonizing the strand under neutral or reducing gas or vacuum conditions in an oven which rapidly heats the strand to a temperature sufficient to obtain carbonization in the presence of a polymerization catalyst of the furan resin or resin precursor, thereby allowing crack free carbonization to be achieved in less than about 5 hours at a rate of temperature change which causes cracking of the strand when substantial polymerizable furan resin remains on the surfaces.

11. The method of claim 10 wherein the precursor is furfural alcohol and a catalyst which is infused in the strand which is simultaneously cured to a resin during the first part of the carbonization.

* * * * *

UNITED STATES PATENT OFFICE
CERTIFICATE OF CORRECTION

Patent No. 3,927,186     Dated   December 16, 1975

Inventor(s) Clarence S. Vinton and Charles H. Franklin

It is certified that error appears in the above-identified patent and that said Letters Patent are hereby corrected as shown below:

In the Abstract, line 4, delete "the first step of which comprises".

In the Abstract, line 6, after "precursor" insert --is described--.

Column 1, line 39, "foamfuran" should be --foam-furan--.

Column 1, line 64, delete the period at the end of the line.

Column 3, line 1, "fexible", should be --flexible--.

Column 3, line 51, insert a closed parenthesis after "N.Y.".

Column 5, line 24, "Theliquid" should be --The liquid--.

Column 6, line 19 "criimped" should be --crimped--.

Column 6, line 57, "0.03" should be --rapid--.

Column 6, line 65, after "between" insert --0.03--.

Column 7, line 23, after "5.8" insert --cm--.

Column 10, line 43, "followiing" should be --following--.

Column 11, line 14, after "9" insert --cm--.

Column 11, line 61, after "9", each occurrence, insert --cm--.

UNITED STATES PATENT OFFICE
CERTIFICATE OF CORRECTION

Patent No. 3,927,186      Dated December 16, 1975

Inventor(s) Clarence S. Vinton and Charles H. Franklin

It is certified that error appears in the above-identified patent and that said Letters Patent are hereby corrected as shown below:

Column 12, Claim 1, line 56 "aallowing" should be --allowing--.

Column 12, Claim 3, line 65, insert a colon after "comprises".

Column 13, Claim 3, line 1, "th" should be --the--.

Column 13, Claim 3, line 14, "neural" should be --neutral--.

Column 13, Claim 6, line 32, "reactng" should be --reacting--.

Column 14, Claim 10, line 21, delete "cured".

Column 14, line 34, "furfural" should be --furfuryl--.

Signed and Sealed this first Day of June 1976

[SEAL]

Attest:

RUTH C. MASON
Attesting Officer

C. MARSHALL DANN
Commissioner of Patents and Trademarks